Jan. 29, 1924.                    1,482,021
O. C. LITTLE
VALVE
Filed July 16, 1919
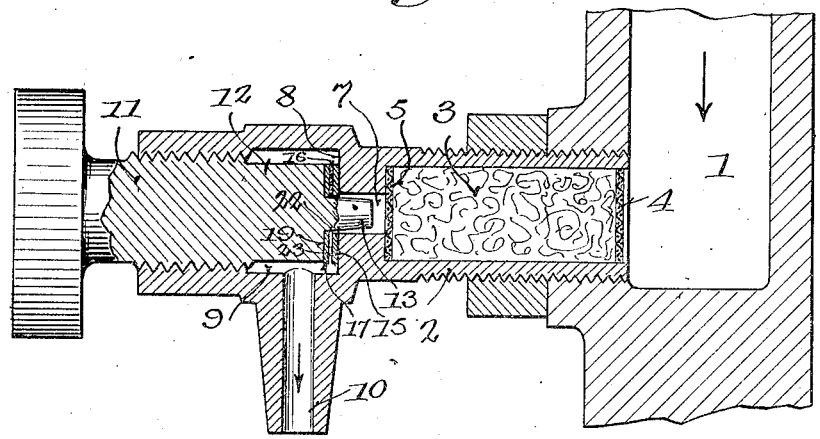
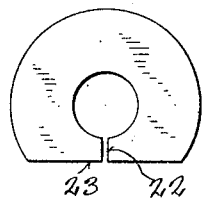 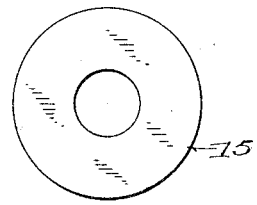
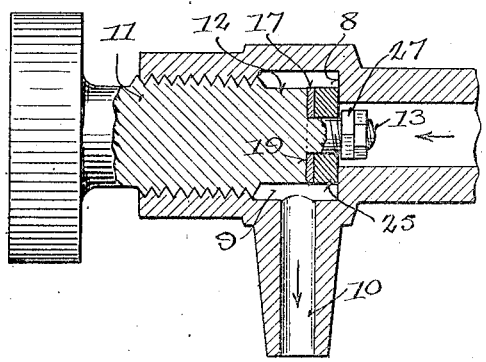
Inventor
Orton C. Little
By Erwin Wheeler & Woolard
Attorneys.

Patented Jan. 29, 1924.

1,482,021

UNITED STATES PATENT OFFICE.

ORTON C. LITTLE, OF MENASHA, WISCONSIN.

VALVE.

Application filed July 16, 1919. Serial No. 311,143.

*To all whom it may concern:*

Be it known that I, ORTON C. LITTLE, a citizen of the United States, residing at Menasha, county of Winnebago, and State of Wisconsin, have invented new and useful Improvements in Valves, of which the following is a specification.

My invention relates to improvements in valves, this invention being a continuation in part of an application filed by me May 4, 1918, Serial Number 232,667, for improvements in humidifiers, which application has matured into Letters Patent 1,312,997.

The invention herein disclosed, however, relates not only to humidifier valves, and other valves designed to provide for a slow and constant delivery of a small quantity of fluid under normal conditions, but also relates to improvements in the general class of valves wherein the valve is pushed to its seat by a rotating screw without rotating the valve head upon the seat.

One object of my invention as herein disclosed and claimed is to provide means whereby a valve head or disk may be loosely and detachably supported by the valve stem and rotated therewith when withdrawn from the seat but may be held against rotation by reason of its frictional contact with the seat as soon as the screw threaded stem brings it to a substantially closed position, whereby the contacting surfaces of the valve and seat may be protected from wear, and valves of relatively soft materials may therefore be used and replaced when necessary by substitute valve heads.

Another object of my invention is to provide a form of valve of the described class which can be constructed at minimum cost, but which will be thoroughly reliable in use and also durable. Also to provide means whereby valve heads may be easily renewed by inexperienced persons.

A further object of my invention is to provide means whereby my improved valve may be used as a drip valve or one which will allow a slow and continuous delivery of fluid, either drop by drop, or in a small stream as may be required, and such delivery kept constant as to quantity through long periods of time.

In the drawings:—

Figure 1 is a vertical sectional view of my improved valve when constructed as a drip valve and used to permit a constant delivery of a small quantity of water or other fluid.

Figure 2 is a detail view of the disk which controls the rate of slow or constant drip delivery.

Figure 3 is a detail view of one of the co-operating disks.

Figure 4 is a view on the same plane as Figure 1, but showing a modified form of valve head, whereby, when the valve is closed, delivery to the outlet is completely cut off.

Like parts are identified by the same reference characters throughout the several views.

In Figure 1 liquid is delivered from a duct or chamber 1 to a filtering cylinder 2 which constitutes the inlet portion of the valve casing. This inlet portion is provided with a central tubular cavity containing a quantity of sponge or other filtering material 3, interposed between a pair of circular screens 4 and 5, at the respective ends of the filtering cylinder or chamber 2, which hold the filtering material in position. At the inner end of the filtering cylinder 2, a port 7 is provided which leads from the filtering cylinder thru the wall 8 to the valve cavity 9, and thence to the outlet nozzle 10.

The valve stem 11 is screwed into the outer end of the casing, and is preferably provided with an unthreaded portion 12 within the cavity 9, and a reduced portion or axially projecting stud or pin 13 which may extend loosely into the port 7, and which also supports a valve head composed of a set of valve members 15, 16, and 17 in such a position that the valve member 15 may seat against the face of the wall in which the port 7 is formed.

The valve member 15 is the seating member. It comprises a thin disc of sheet metal suitably apertured to loosely receive the projection 13. The valve member 17 is a bearing member, which fits against the shoulder 19 and takes the wear, while the valve head is stationary upon the seat when the stem rotates.

The intermediate valve member 16 is adapted to control the drip or slow delivery. It will be observed that the aperture in the valve member 15 is a little larger than the stud 13 and the liquid may therefore follow the stud 13 to the member 16. But the member 16 is radially slotted as shown at 22 forming a by-pass duct of small rectangular cross-section and preferably has a portion of its periphery cut away across the slot or recess at 23, whereby the liquid following the stud or pin 13 thru the disk 15, may pass thru the short slot 22 to the space formed by the recess 23 and thence to the cavity 9 and its outlet or nozzle 10.

The disks or valve members 15, 16 and 17, may be stamped or cut from sheet brass or copper of any desired gage. The disk 16 may therefore be very thin and this will determine the capacity of a slot 22 of predetermined width, in such a manner as to allow a reduction in capacity far below what can reliably be secured by drilling a round hole thru a solid body of metal. In fact the friction of the liquid upon the walls of the slot 22 is such as to materially retard the flow, for the liquid escapes in a thin film between the walls of the other disks 15 and 17, and must overcome a very material resistance, due to capillary attraction.

But this flat, and wide, but thin passage will not be clogged by any foreign matter that could pass thru the filter, for the reason that the passage is an elongated rectangle in cross section and any particle of foreign matter that would reach across it and bind upon the side walls, would have to also conform substantially to the other dimension in order to clog the passage or even to materially affect the quantity of liquid passing thru it. The central opening in this disk, being slightly larger than the stud will also allow any such particle of foreign matter to be pushed away from the slot by the escaping liquid. Experiments conducted by me have demonstrated that valves constructed in this manner will allow a constant escape of water in drops falling at regular intervals thru long periods of time, in fact thru many months at least.

In Figure 4, the disk 16 is omitted, and a thicker disk 25 is substituted for the disk 15. The disk 25 may be formed of lead, rubber or any other material, preferably of relatively soft material which will not rotate after contacting with the seat, the shoulder 19 being more freely rotated upon the disk 17 and the latter being also free to rotate upon the disk 25.

I preferably form the stud 13 with a slight taper, at least in proximity to the stem shoulder 19 whereby the disk 17 may have a central aperture of the same diameter as the other disks and nevertheless have relatively less freedom of movement upon the stud. If it is desired to have this disk rotate with the stem the stud may be tightly fitted to the disk aperture.

The stud 13 in Figure 4 is preferably provided with a nut 27 or equivalent disk retaining fastening adapted to prevent the disks from sliding from the stud when the stem is retracted.

I claim:—

1. A valve stem provided with an axial stud projection at its inner end and a radially slotted disk loosely and rotatably mounted thereon and adapted to be pushed by the stem against a valve seat, the radial slot and loose mounting of the disk being adapted to allow fluid delivery at a slow rate even when the disk is pressed against the valve seat.

2. A valve stem provided at its inner end with an axially disposed stud of reduced diameter, and a plurality of apertured disks supported by the stud, an intermediate disk being provided with a radial slot adapted to form, in connection with said apertures, a bypass of limited capacity.

3. A valve having an apertured portion provided with a seating surface, a shouldered supporting portion and an intermediate portion adapted to form a cavity in registry with the aperture in the seating portion and co-operating with the seating portion and shouldered portion to form a radially extending by-pass duct of small rectangular cross-section, adapted when the valve is closed to permit a slow delivery of water through said duct while preventing water delivery past any other portion of the valve.

4. A valve stem, provided with an axially disposed stud of less diameter than the stem at its inner end, in combination with a plurality of apertured disks supported by the stud and constituting a valve head adapted to be clamped by the stem between its inner end and the valve seat, one of said disks having a slot of limited fluid delivering capacity extending from its central aperture to its outer margin.

5. A valve head comprising a set of apertured disks, including an intermediate disk provided with a slot of limited fluid delivering capacity extending from its aperture to its outer margin.

6. A valve head comprising a set of apertured disks, and means for bypassing a limited amount of fluid thru an intermediate disk whereby the valve head can never entirely shut off the fluid supply.

7. A valve including the combination of a casing provided with a seat, a valve stem axially propellable toward the seat, a plurality of apertured disks loosely mounted upon the stem, a shoulder upon the stem whereby the disks may be forcibly contacted with the seat, a bypass duct of small rectangular cross-section adapted to be unaffected by the closing of the valve, and a filter adapted to intercept material capable of stopping the duct.

8. A valve including the combination of a casing provided with a seat, a valve stem axially propellable toward the seat and having a reduced end forming a shoulder and an apertured disk radially slotted from the aperture to its margin mounted loosely upon the reduced end of the stem and adapted to be forced by the shoulder against the seat, the slot constituting a bypass of rectangular cross section whereby a limited discharge of fluid past the closed valve is allowed.

9. A valve head comprising a set of apertured disks, in combination with an actuating stem having a reduced portion loosely engaged in the apertures and also having an annular clamping shoulder to engage one of the disks, and clamp the disks between it and the valve seat, one of the intermediate disks being provided with a radially extending slot adapted to permit a slow delivery of fluid when the valve is closed.

10. A valve stem provided with a shoulder and a tapered portion of reduced diameter extending from the shoulder to the inner end of the stem, in combination with a valve head comprising a plurality of apertured disks loosely mounted upon said tapered portion, an intermediate disk being radially slotted whereby a limited amount of fluid will be delivered along the tapered portion of the stem within the apertures and thru the slot.

In testimony whereof I affix my signature in the presence of two witnesses.

ORTON C. LITTLE.

Witnesses:
CHARLES H. VELTE,
DOROTHY HECKRODT.